United States Patent [19]

Baghdady

[11] 3,911,366

[45] Oct. 7, 1975

[54] RECEIVER INTERFERENCE SUPPRESSION TECHNIQUES AND APPARATUS

[76] Inventor: Elie J. Baghdady, 21 Overlook Drive, Weston, Mass. 02193

[22] Filed: Nov. 13, 1958

[21] Appl. No.: 773,785

[52] U.S. Cl. .................................. 325/347; 325/474

[51] Int. Cl.$^2$ .............................................. H04B 1/16

[58] Field of Search ............ 250/20.5, 20.52, 20.53, 250/20.56, 20.55, 20.28, 20.54; 325/344, 347, 473, 474

[56] References Cited

UNITED STATES PATENTS

| | | | |
|---|---|---|---|
| 1,481,284 | 1/1924 | Deardorff | 250/20.54 |
| 2,151,739 | 3/1939 | Burrill | 250/20.52 |
| 2,388,200 | 10/1945 | Wilmotte | 250/20.54 |
| 2,394,544 | 2/1946 | Gottier | 250/20.54 |
| 2,428,265 | 9/1947 | Crosby | 250/20.28 |
| 2,586,190 | 2/1952 | Wasmansdorff | 250/20.52 |
| 2,684,439 | 7/1954 | Wilmotte | 250/20.5 |
| 2,761,964 | 9/1956 | Rosenzvaig | 250/20.52 |
| 2,880,269 | 3/1959 | Dorme | 250/20.56 |
| 2,912,573 | 11/1959 | Mitchell | 250/20.52 |
| 2,927,997 | 3/1960 | Day | 250/20.52 |

OTHER PUBLICATIONS

Frequency Modulation by Arguimbau and Stuart, published in 1946 by John Wiley & Sons, Inc., N.Y., pp. 21 and 83–86.

Article (1), "Wave-traps and Selectors," by Mee, Wireless World, Mar. 22, 1935, p. 285.

*Primary Examiner*—Maynard R. Wilbur
*Assistant Examiner*—H. A. Birmiel
*Attorney, Agent, or Firm*—Burns, Doane, Swecker & Mathis

EXEMPLARY CLAIM

1. A frequency modulation receiver for separating a stronger and a weaker signal comprising two channels, first limiting means in a first channel, second limiting means in said first channel, limiting means in the second channel, linear transfer means in said second channel, and means for combining the outputs of the two channels.

11 Claims, 8 Drawing Figures

INVENTOR.

BY Elie J. Baghdady

INVENTOR.

BY Elie J. Baghdady

INVENTOR.

BY Elie J. Baghdady

INVENTOR.

BY Elie J. Baghdady

INVENTOR.

BY Elie J. Baghdady

RECEIVER INTERFERENCE SUPPRESSION TECHNIQUES AND APPARATUS

This invention relates to frequency-modulation receivers and is concerned with techniques and apparatus for suppressing the disturbances that are caused by certain troublesome forms of interference. Specifically, the purpose of this invention is to provide systems and apparatus that will make it possible to capture a desired signal in the presence of an undesired signal whose amplitude may be either greater or smaller than the amplitude of the desired signal, when the two signals occupy the same frequency band.

It is a further object of this invention to provide signal processing techniques for FM receivers that would make it possible to realize a new system of FM multiplex transmission which could compete with and/or supplement existing systems of FM multiplex transmission, depending upon the specific application involved in each case.

It is yet a further object of this invention to provide economical signal processing techniques that would make it possible to provide more efficient use of frequency space than is presently practicable.

The operations that the sum of two cochannel signals encounter is going through a well-designed conventional FM receiver will usually deliver a substantially undistorted replica of the message that is carried by the stronger signal, and exclude almost completely the effect of the presence of the weaker signal. This stronger-signal capture effect is a great asset of a communication system, as long as there is some assurance that the desired signal will be the stronger of the two competing signals within the same channel. But in situations in which the desired signal is just as likely to be the weaker of the two as it is to be the stronger, the desired signal will often be suppressed irretrievably.

The development of signal-processing techniques that would make it possible to capture the weaker signal, when this is desirable, would not only facilitate more reliable communication, but would also give great promise of providing more efficient use of the crowded frequency spectrum.

This invention consists of a signal-cancellation technique that aims at switching the roles of "weaker" and "stronger" in the two signals before they reach the final FM demodulation stage. In this invention, the desired result is achieved through signal processing techniques that will be referred to, for convenience, as dynamic-trapping and feedforward.

In dynamic-trapping systems, some means is first devised for extracting the frequency modulation of the stronger signal with reasonable accuracy. This information is then used to guide a trap system, in order to attenuate the stronger signal. The attenuation, or cancellation, of the stronger signal is achieved either by making a dynamic trap track the signal, or by "freezing" the instantaneous frequency of the signal so that it always equals the resonant frequency of a fixed trap. Thus, if the modulation of the stronger signal is applied to change the value of a simulated reactance that forms a variable tuning element in a trap circuit, the attenuation band of the trap can be made to follow the instantaneous-frequency position of the stronger signal. Alternatively, the stronger-signal modulation can be made to change the frequency of a local oscillator so that it always differs from the instantaneous frequency of the stronger signal by an amount that equals the resonant frequency of a stationary trap.

In feedforward systems, the resultant of the two input signals is channeled through two independent unilateral signal paths whose outputs are recombined at a later stage in the receiver. In this way, the signals can be processed so that their relative amplitudes at the output of one path are significantly different from their relative amplitudes at the output of the other path. Appropriate superposition of the resulting receiver-path outputs would then lead to the suppression of whichever of the two signals is undesired. Specifically, in one of the signal paths, a cascade of narrow-band limiters (or some other means of enhancing the predominance of the stronger over the weaker signal) might be used. In the other path, the primary object would be to provide a phase-shift characteristic that is identical with that of the first path within the desired passband. If the outputs of these paths are combined subtractively, the resulting signal cancellations can be made to suppress whichever of the two signals is undesired. The parameter that decides which of the two signals is to predominate is the ratio of path outputs. Control of this ratio enables the receiver to switch from capture of the weaker to capture of the stronger signal.

According to the new system of FM multiplex transmission that is made possible by the techniques of this invention, a transmitting station with a prescribed frequency space assignment can double the number of programs that it can transmit simultaneously with existing techniques by transmitting two frequency-modulated carriers simultaneously in the same band that need differ only in amplitude. The spectra of the modulated carriers could be completely overlapping, partially overlapping, or not overlapping at all.

In the accompanying drawings.

Figure 3:
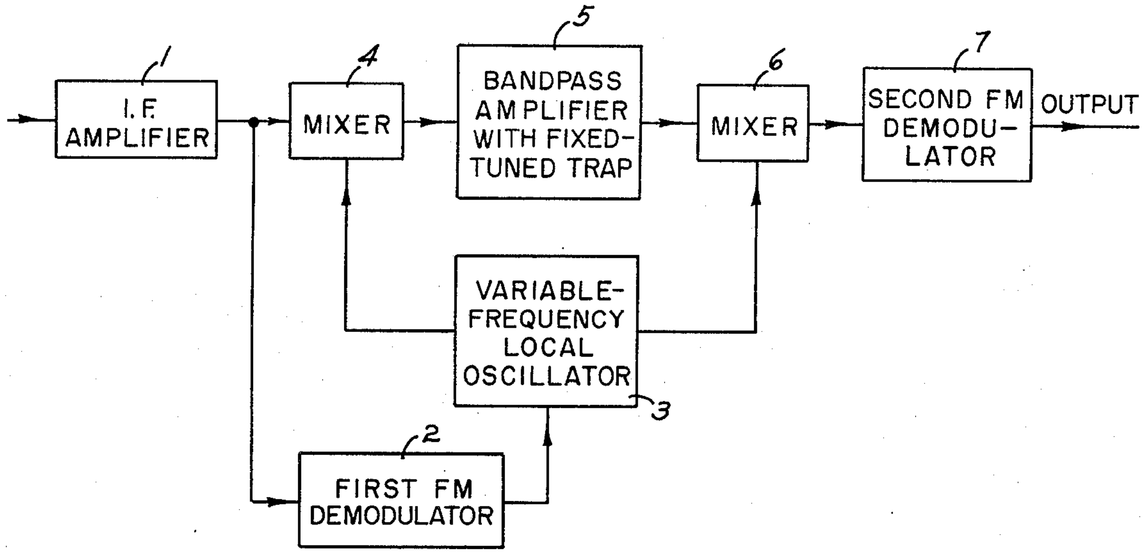
Figure 3:
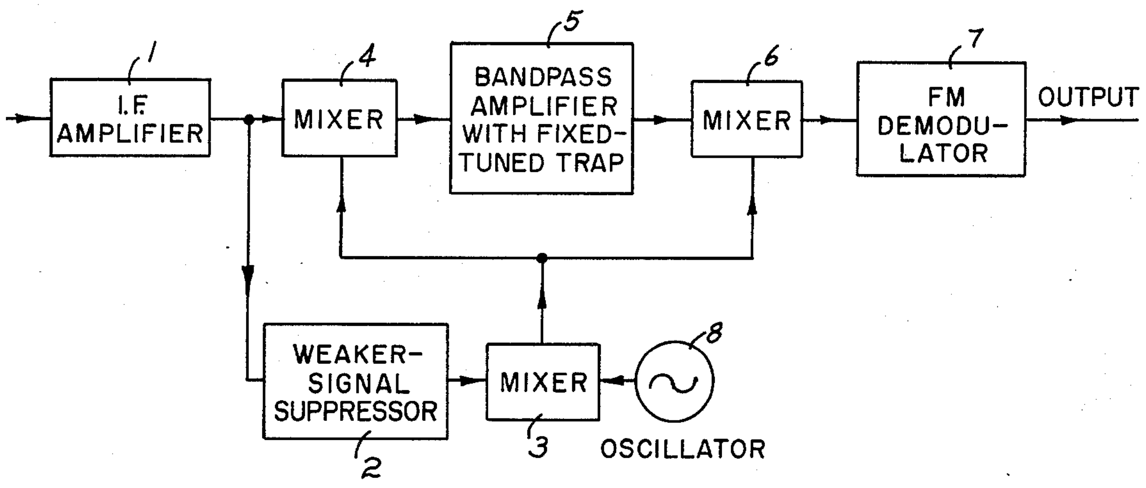

FIGS. 3(*a*) and 39(*b*) show block diagrams that illustrate two specific embodiments of the fixed-tuned trap technique.

Figure 4A:
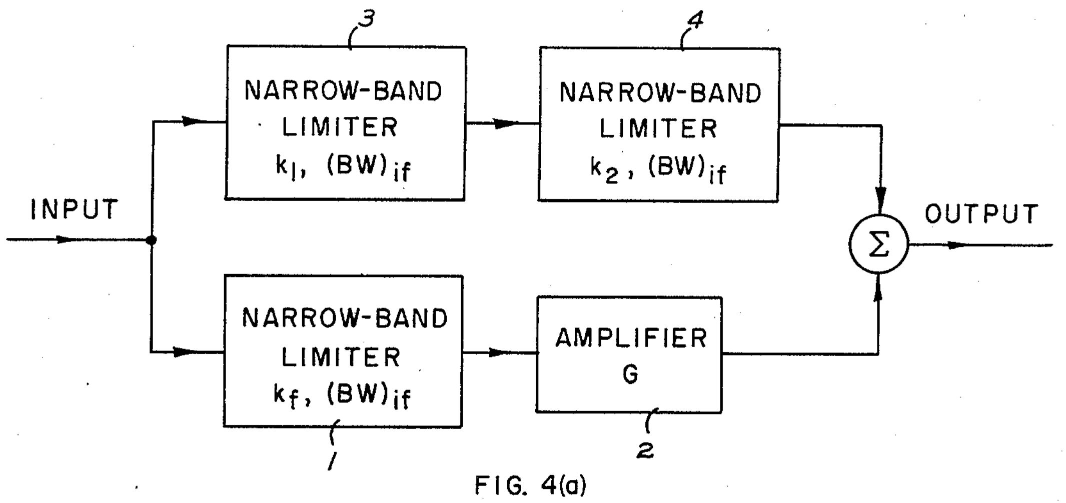
Figure 4B:
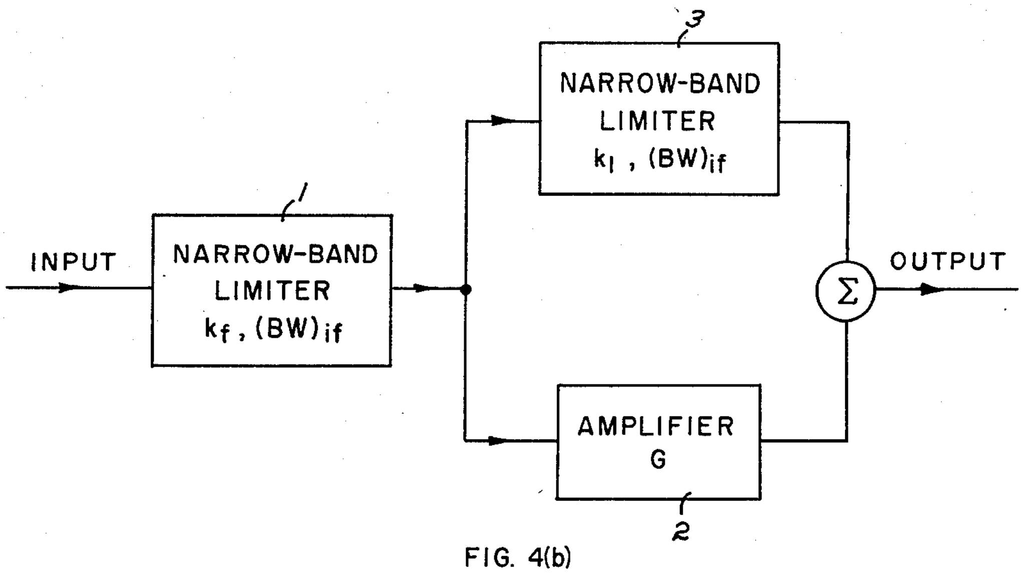

FIGS. 4(*a*) and 4(*b*) show block diagrams that illustrate two simple, but in effect, equivalent embodiments of the feedforward technique.

Figure 5:
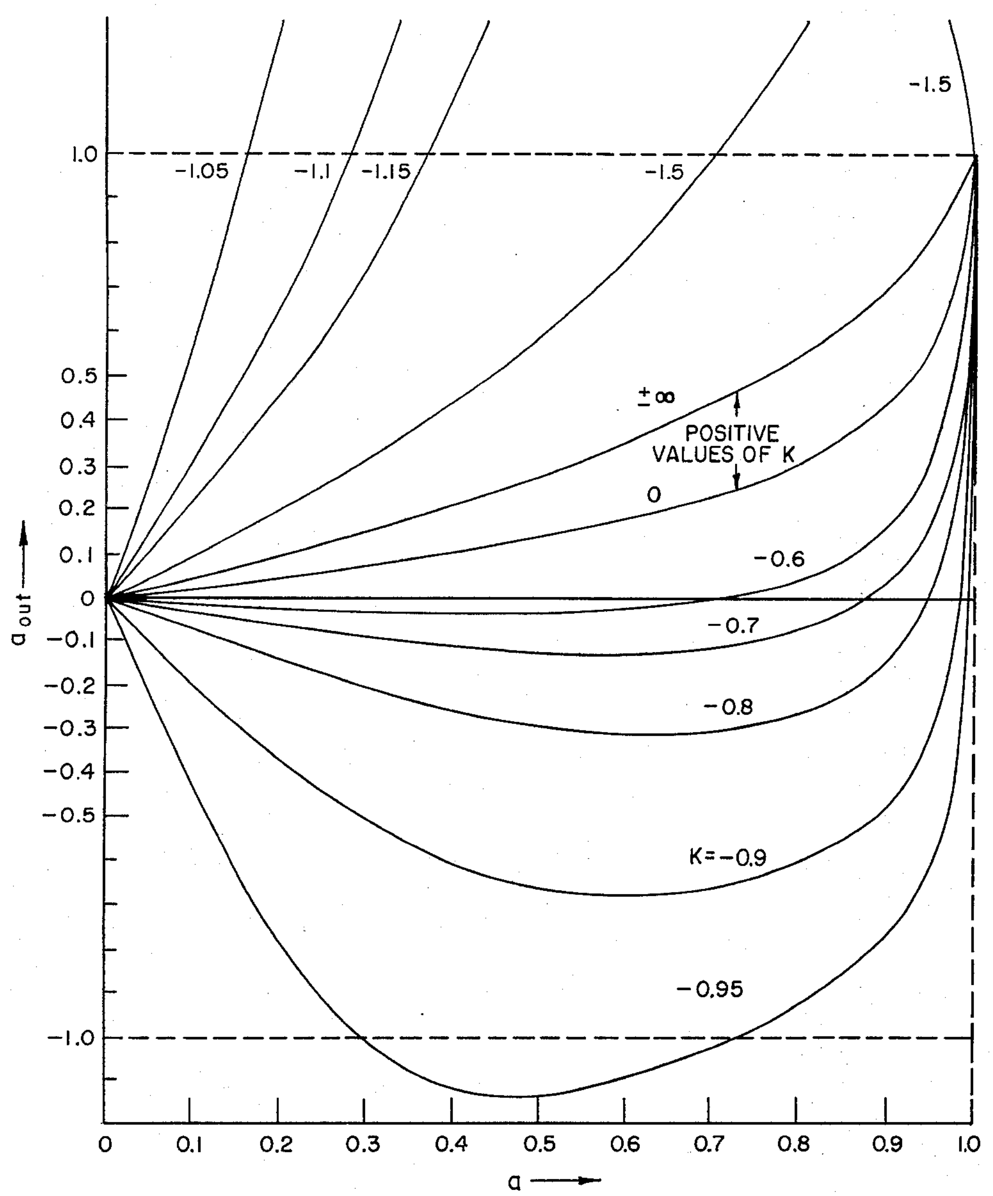

FIG. 5 presents a family of theoretically determined performance curves that are helpful in predicting what can be achieved with the simple feedforward systems illustrated in FIGS. 4(*a*) and 4(*b*).

Figure 6:
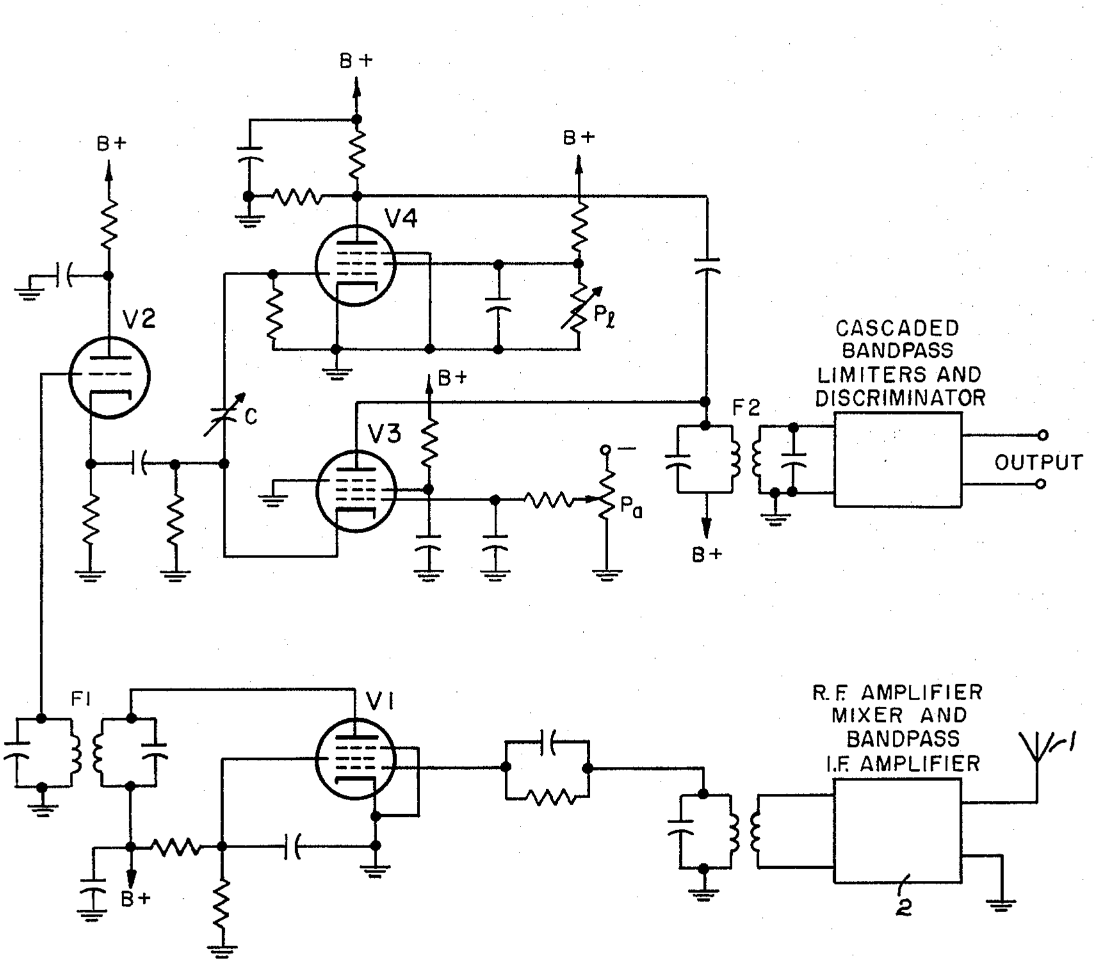

FIG. 6 is the circuit diagram of one of the experimental feedforward systems used to test the theory of the feedfoward technique. The blocks shown in this figure concern sections of conventional FM receivers whose details are not of primary interest in the discussion of this invention.

Figures 1, 2:
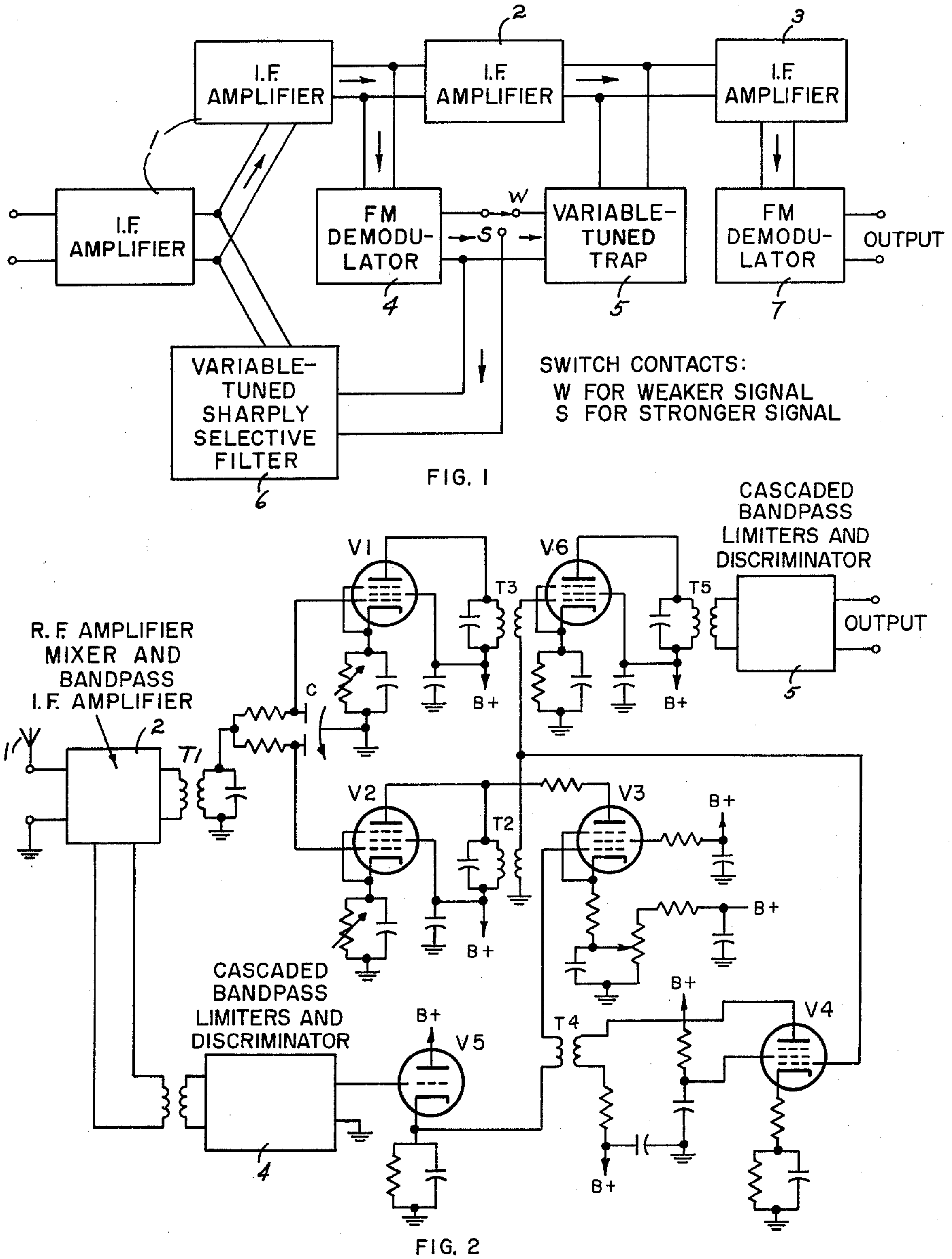
FIG. 1 is a block diagram which illustrates an embodiment of the dynamic variable-tuned trap system, and a dynamic variable-tuned signal selector.
FIG. 2 is the circuit diagram of one of the experimental systems used to test the principles of the dynamic variable-tuned trap technique. The blocks shown in this figure concern sections of conventional FM receivers whose details are not of primary interest in the discussion of this invention.

I now refer to FIG. 1 which illustrates an embodiment of the variable-trap technique. In this figure, the i-f amplifier (unit 1) provides the usual i-f selectivity and gain in the FM receiver. If two signal carriers are passed simultaneously by this amplifier, the average output voltage of the first FM demodulator (unit 4) can be made to vary directly with the instantaneous frequency of the stronger signal. The output of unit 4 (after appropriate low-frequency filtering) can be impressed directly upon the input of a reactance tube in order to vary the tuning of a high-Q trap (unit 5). The trap introduces a depression in the response of the i-f amplifier (unit 2) that is centered approximately about the frequency of the stronger signal. The resulting attenuation should decrease the amplitude of the stronger signal by a sufficient amount to enable the initially weaker signal to predominate. The average voltage at the output of the last FM demodulator (unit 7) will then vary directly with the instantaneous frequency of the weaker signal, except when both signals fall within the heavy-attenuation band of the trap. When this happens, and if the undesired signal is not cancelled out completely by the trap, the signal amplitudes will go through equality at least twice as the weaker signal sweeps across the attenuated band. The resulting transitions in capture from one signal to the other will be accompanied by corresponding bursts of distortion in the detected output waveform. The duration of these distortion bursts can be decreased by designing the FM demodulator (unit 7) to handle weaker-to-stronger signal-amplitude ratios that are close to unity. If the Q of the trap is sufficiently high, the attenuated band will cover a small fraction of the i-f bandwidth. Thus, when the two signals fall simultaneously within the trap attenuation band, their frequency difference is small and the deviation of the instantaneous frequency of the resultant signal from the frequency of either signal is small.

But a very high-Q trap can cause important FM transients when it is swept by an FM signal. Fortunately, experimental results show that the weaker-signal capture performance of the system is not affected materially by the trap bandwidth if the second FM demodulator is sufficiently well designed. This performance, however, is strongly influenced by the degree of cancellation of the stronger signal by the trap.

In the absence of interference, the output of unit 4 should be disconnected from the trap. The trap should be so designed that this disconnection (by removing or adding a capacitor or an inductor) detunes the trap and, hence, makes it resonate at a frequency that lies outside the desired i-f range. Alternatively, the switch may be arranged in such a way that the trap circuit is completely disconnected from the signal path in the absence of interference.

If the stronger signal is the signal that is wanted, we can boost its amplitude by introducing a high-Q variable-tuned circuit (unit 6) whose center frequency is controlled by a reactance tube. This arrangement, which may be referred to as a dynamic variable-tuned signal selector, should help decrease the random-noise bandwidth and improve the predominance of the stronger signal over the interference. Significant improvement in performance could be achieved thereby, particularly in the presence of impulsive interference.

In FIG. 2 I present the schematic of a trap system that we used to test the basic principles of the variable-trap technique. The choice of trap circuit was made on the basis of flexibility and ease of variation of the important trap parameters in the course of the experimental study.

The trap circuit of FIG. 2 consists of two voltage amplifiers ($V_1$ and $V_2$) with single-tuned plate loads whose circuit Q's have widely different values. The lower-Q ($\cong 5$) circuit ($T_3$) is fixed. The higher-Q ($\cong$ 30–260) circuits ($T_2$), which is intended to contribute the trap attenuation, has a center frequency that is dictated in part by a controllable reactance (circuits of $V_3$ and $V_4$, driven by $V_5$). Each resonant circuit is closely coupled to an untuned secondary, and the secondaries are added with opposite polarities. The choice of very low Q for the fixed-tuned circuit was made to enable the signal at the center of the trap response to be superimposed upon the corresponding signal across the secondary of the low-Q circuit essentially in phase opposition over the entire range of expected trap center frequencies. A variation of the amplification of either (or both) of the amplifiers (by means of potentiometers in the cathode circuits) provides direct control over the maximum value of the trap attenuation. Fine adjustment of the phasing between the secondary voltages is provided by a phase-shifting network (in secondary of $T_1$) that depends upon the variable capacitor C in order to control the phasing of the signals that drive the amplifiers.

The center frequency of the dynamic trap is determined by the resonance frequency of the high-Q tuned circuit ($T_2$ in FIG. 2). The position of the trap attenuation band can therefore be varied by varying one of the tuning elements. The reactance-simulator circuit shown in FIG. 2 was developed especially to provide the desired variable reactance without any noticeable attendant variation in the resistive component that the circuit imposes across the tank of the high-Q trap. In this circuit, tube $V_4$ is driven through a step-down transformer ($T_2$) in order to avoid over-driving its grid. This voltage is amplified in the plate circuit of $V_4$ and undergoes a 90° phase shift in the low-loss inductive load ($T_4$). The voltage across the secondary of $T_4$ drives $V_3$, which in turn acts as an amplifier and a current source that feeds the high-Q tank circuit ($T_2$) of the trap. If the step-down ratio of $T_2$ is $a$ and that of $T_4$ is $b$, the plate circuit of $V_3$ places across the tank circuit ($T_2$) of the trap an admittance $$Y = \frac{1}{r_{p_3}} + j\omega[ab\, g_{m_4} g_{m_3} L_{T_4} + C_{pk_3}].$$

The capacitive component evidently can be varied by varying the $g_m$'s of $V_3$ and $V_4$.

In the experimental system of FIG. 2 the modulation of the stronger signal was made to vary the $g_m$ of $V_3$. This modulation is applied from the cathode of $V_5$ in series with the secondary of $T_4$, and its proper phasing is vitally important to the successful tracking of the stronger-signal frequency by the resonance frequency of the trap.

A detailed investigation using the circuit shown in FIG. 2 has shown that the introduction of a dynamic trap that tracks the frequency of the stronger signal and attenuates this signal is an effective, practical technique for capturing the weaker of two cochannel FM signals (whose spectra overlap completely or partially) even when this signal is much weaker than the other signal. With appropriate circuit design, the message of the weaker signal can be received even in the presence of another cochannel signal that is more than 100 times as strong.

FIGS. 3($a$) and ($b$) show block diagrams that illustrate specific embodiments of the fixed-tuned trap technique. In FIG. 3($a$), the message of the stronger signal is again derived at the first FM demodulator (unit 2) and it is used to control a reactance-simulator arrangement in order to deviate the frequency of the oscillator (unit 3). The purpose of this deviation is to keep the difference in frequency between the local oscillator voltage and the input stronger signal equal to the constant center frequency of the trap attenuation band. This amounts to the regeneration of only the stronger signal at a second intermediate frequency that differs from the first by an amount that equals the constant center frequency of the fixed trap. In FIG. 3(*b*) a substantial approximation to this result is achieved without having to extract the modulation of the stronger signal for use in modulating a local oscillator. In FIG. 3(*b*), the two incoming signals are passed through a weaker-signal suppressor (unit 2) which can be realized, for example, by means of an amplitude limiter whose filter has a bandwidth of the order of one i-f bandwidth, or by means of more than one such limiter in cascade, or by means of a limiter or limiters with regenerative feedback, or by means of a feedforward system that is adjusted to suppress the weaker signal. The output of unit 2 in FIG. 3(*b*) is multiplied in unit 3 by a fixed-frequency signal from an oscillator (unit 8). In the resulting product at the output of the mixer of unit 3, a signal whose frequency equals the sum of, or the difference between, the frequencies of the oscillator voltage and the signal delivered by unit 2, is selected, as desired, to represent the approximation to the regenerated signal that carries the modulation of the stronger of the two input signals.

Having thus regenerated the stronger signal or an approximation to it, at a second intermediate frequency that differs from the first by an amount that equals the constant center frequency of the fixed trap, we channel this regenerated signal in FIGS. 3(*a*) and (*b*) to serve as a local-oscillator signal for the mixers marked 4 and 6 in FIGS. 3(*a*) and 3(*b*). The purpose of the block marked 4 in each of these figures is to subtract the frequency modulation of the stronger signal from each of the two incoming signals. The bandpass filter whose response is modified by a fixed-tuned trap arrangement (unit 5) operates on the signals delivered by unit 4 in such a way that the fixed-frequency signal (that corresponds to the stronger of the two input signals) is attenuated by the trap by an amount that makes it weaker than the other signal as long as the frequency of this other signal differs from the center frequency of the fixed trap. Since the output of unit 5 is made up of a fixed-frequency residual signal at the center of the band plus a predominant modified signal that carries the algebraic sum of the modulations of the two input signals, the second mixing operation in unit 6 will restore the original frequency modulations to the modified signals, but the desired message will now be carried by the stronger of the two. A conventional FM demodulator (unit 7) following the second mixer (unit 6) operates on the modified signals to deliver the message of the desired (originally weaker) signal.

The principles embodied in the fixed-tuned trap system have also been verified in the laboratory. Results similar to those that were achieved with the dynamic-trap system were obtained with the fixed-trap system.

In FIGS. 4(*a*) and (*b*) we present what may be considered the simplest realizations of the feedforward system. With reference to FIG. 4(*a*), the limiter (unit 1) and amplifier (unit 2) in the lower signal path are, in effect, equivalent to one idealized narrow-band limiter. The upper signal path contains two narrowband limiters (units 3 and 4). Each idealized narrow-band limiter is for the purpose of the ensuing analysis assumed to incorporate an ideal filter of one i-f bandwidth and to deliver an output sinusoid whose amplitude is $k$ volts in response to an input sinusoid of amplitude $E_{in} > 0$. Limiters are inserted in each of the two signal paths in order to ensure that the properties of the output signals will be independent of the input signal level, as long as the resultant input signal amplitude exceeds a certain threshold value.

For purposes of interference rejection, the system of FIG. 4(*b*) is identical in its effect with the one shown in FIG. 4(*a*), but it requires one less limiter. The arrangement in FIG. 4(*b*) is the more desirable for practical realization. It is easy to show that if the first limiter (unit 1) in FIG. 4(*b*) is not narrow-band, the combination of the second-limiter and amplifier outputs in phase opposition cannot effect the type of cancellation that is necessary for achieving beneficial changes in the interference conditions at the output.

For the purposes of the present discussion, the interference is considered to arise from the simultaneous presence of two signals of amplitudes $E_s$ and $aE_s$ ($a < 1$) and frequencies $p$ and $p+r$ rad/sec ($r << p$) within the passband of the i-f amplifier. To simplify the analysis, these two carriers will be assumed to have constant amplitudes; their frequency modulations are assumed to be so slow that, for the time being, the frequencies can be considered stationary. Thus, the resultant signal at the output of the *i-f* amplifier can be expressed as $$e(t) = E_s \cos pt + aE_s \cos (p+r)t \text{ with } a < 1 \text{ and } r << p. \quad (1)$$

The ideal limiter is, by definition, a device that will operate upon the resultant of the two carriers and deliver an output signal given by $$e_l(t) = k \cos [pt + \theta(t)], \text{ where } k \text{ is a constant, and} \quad (2)$$

$$\theta(t) = \tan \frac{a \sin rt}{1 + a \cos rt}. \quad (3)$$

By a direct Fourier analysis $$e_l(t) = k \sum_{n=-\infty}^{\infty} A_n(a) \cos (p - n\, r)t. \quad (4)$$

In the analysis of the equivalent feedfoward systems of FIG. 4(*a*) and (*b*), we note that for a given weaker-to-stronger signal amplitude ratio $a$ at the input, the conditions of interference that arise with the frequency differences $r = 0$ and $r = (BW)_{if}$ are of special interest. The importance of these two limiting conditions stems from the fact that the amount of reduction in the equivalent weaker-to-stronger signal amplitude ratio that will be effected by a chain of narrow-band limiters decreases with a decrease in the value of the frequency difference, $r$, between the two signals, relative to the limiter bandwidth. As demonstrated by the inventor in E. J. Baghdady, "Interference Rejection in FM Receivers," Technical Report 252, Research Laboratory of Electronics, M.I.T., Sept. 24, 1956, and in E. J. Baghdady, "Theory of Stronger-Signal Capture in FM Reception," Proc. IRE, vol. 46, pp. 728–738, April, 1958, the effect of narrow-band limiting upon the FM disturbance caused by interference between two signals will increase with an increase in the degree of frequency-band limitation suffered by the amplitude-limited resultant of the two signals when they go through the limiter filter. For $r = 0$, the amplitude-limited resultant of the two input signals will experience no frequency-band limitation is going through the limiter filters, whereas, the greatest possible band limitation will be experienced with $r = (BW)_{if}$. When the frequency difference $r$ lies between $r = 0$ and $r = (BW)_{if}$, the effect of passing the resultant signal through the system will be intermediate between the extremes indicated for $r = 0$ and $r = (BW)_{if}$.

Thus, for frequency differences that exceed one-half of the i-f bandwidth, the spectrum at the output of the idealized narrow-band limiter will consist of only the components whose frequencies are $p$ and $p + r$ rad/sec. From Eq. 4, we find that these components have amplitudes given by $k_1\ A_o(a)$ and $k_1\ A_{-1}\ (a)$ if they are observed at the output of the first-encountered narrow-band limiter, and $k_2A_o(a')$ and $k_2A_{-1}(a')$, $a' = A_{1-1}(a)/A_o(a)$, if they are observed at the output of the second-encountered limiter, and so on. If the two signal paths are assumed to have identical phase characteristics, an additive combination of the path outputs results in two signals at $p$ and $p + r$ rad/sec with the new relative amplitudes. The quantity $$a_{out} = \frac{A_{-1}(a') + K\ A_{-1}(a)}{A_o\ (a') + K\ A_o\ (a)}. \qquad (5)$$

with $k_f$, $k_2$, and $G$ as defined in FIG. 4, and $$K = (k_f/k_2)\ G, \qquad (6)$$

constitutes the ratio of the amplitude of the signal at $p + r$ rad/sec (which corresponds to the originally weaker signal) to that of the signal at $p$ rad/sec.

A family of curves for $a_{out}$ versus $a$ is shown in FIG. 5, with a $K$ as a running parameter. Note that $K$ is the ratio of the output of the lower signal path to the output of the upper signal path when the input excitation is a single unmodulated carrier. Negative values of $K$ can be interpreted as indicating the condition in which the phase characteristics of the two paths differ by a constant value of $\pi$ (or by an odd multiple of it) but are otherwise identical functions of frequency. From its definition in Eq. 6, the parameter $K$ depends only upon certain design constants of which the gain of the amplifier is an easily controllable factor. Evidently, $K$ would not be a constant that is subject to a priori adjustment for all usable signal levels at the input if the lower signal path in FIG. 4($a$) did not contain the limiter that is shown, or if the first limiter in FIG. 4($b$) were absent. That the parameter $K$ should be substantially independent of the input signal levels is an important requirement for achieving interference-suppression performance that is independent of the input signal level.

The curves of FIG. 5 reveal some interesting possibilities in relation to the capture of the weaker or of the stronger of the two input signals under the conditions of this analysis. For example, for values of $K$ that lie in the range $-0.8 < K < 0$, the system will depress the ratio of weaker-to-stronger signal amplitude to a value that is smaller than 0.4 for all input values of this ratio that are below 0.9. This represents substantial enhancement of the predominance of the originally stronger signal. The curve for $K = -0.6$ shows that the value of $a_{out}$ is less than 0.05 for all $a$ less than 0.8.

Values of $a_{out}$ that exceed unity correspond to the situation in which the combination of the signal-path outputs enables the originally weaker signal to emerge as the stronger of the two. Thus, for $K = -1.05$, $a_{out}$ is greater than one for all $a$ in the range $0.16 < a < 1$. It is evident that as $-K$ approaches 1, from the right, the range of $a$ values in which the originally weaker signal will emerge as the stronger widens and its lower limit approaches $a = 0$. But values of $K$ that are centered about $-1$ indicate signal cancellation that becomes more and more complete as $K$ approaches $-1$. It is clear, therefore, that a limit on how closely $K$ can approach $-1$ is placed by considerations that relate, first, to the random noise level at the output of the system; second, to the signal-level requirements and sensitivity of the stages driven by it; and last, but not least, to the role that the presence of other sideband components will play in deciding the character of the resultant output signal when the frequency difference r becomes smaller than one-half of $(BW)_{if}$.

Consider, next, the situation in which $r$ approaches zero. For values of $r$ that are less than $$r_{min} = \beta\ \frac{1-a}{1+a}(BW)_{if}, \qquad (7)$$

where $\beta \cong 0.2$ for an ideal filter, the signal at the output of each limiter will approach the amplitude-limited resultant of the two input signals more and more closely. Consequently, the signal at the output of the system will approach $$e_{out}(t) = k_2(1+K)\cos[pt + \theta(t)], \qquad (8)$$

with $\theta(t)$ as defined in Eq. 3. This shows that for values of r that make up a small fraction of the limiter-filter bandwidth, the average frequency of the output signal will always equal the frequency of the stronger of the two input signals. This means that if the chosen value of $K$ enables the system to deliver an output signal whose average frequency equals the frequency of the weaker signal when $r$ falls in the range $(BW)_{if}/2 < r < (BW)_{if}$, this condition for the capture of the weaker signal will not subsist as $r$ takes on values that are small fractions of the i-f bandwidth. Consequently, with a given value of inpu weaker-to-stronger signal amplitude ratio, the capture at the output of the system will shift from the weaker to the stronger signal as $r$ is decreased, and back to the weaker signal as $r$ is increased again. The transition in the capture will take place within a frequency-difference range centered about a value of $r$ that is intermediate between $r_{min}$ (as given by Eq. 7) and $(BW)_{if}/2$. While $r$ is going through this range of values, the reception at the output of the succeeding FM demodulator will be marred by the severe distortion that is usually experienced with conventional FM receivers when $a$ exceeds the capture ratio of the receiver and approaches unity. Evidently, if either of the systems of FIG. 4($a$) and ($b$) is used to facilitate the capture of the weaker signal, it should be followed by an FM demodulator of high stronger-signal capture capability in order to minimize the duration of the severe distortion that accompanies the capture transition from one signal to the other. However, if the system is used to suppress the weaker signal, no capture transitions will arise in the course of a modulation cycle.

Detailed numerical analysis indicates that as the frequency difference between the two signals decreases, the amount by which the relative amplitudes of the spectral components at the output of the upper signal path will differ from the relative amplitudes of the corresponding components in the lower signal path decreases also. For values of the frequency difference that constitute small fractions of $(BW)_{if}$, there is no excess narrow-band limiting effect in the upper signal path, and the relative amplitudes of corresponding components in each path are the same. This means that the ability of this system to enhance the capture of either the stronger or the weaker of the two signals also decreases with a decrease in the value of $r$ relative to $(BW)_{if}$. The most detrimental distortion in the reception of the weaker signal is actually the distortion that arises while the average frequency at the output is in transition from the value dictated by the frequency of one of the signals to the value dictated by the frequency of the other. The difference between these average values is small when $r$ is small.

The capture-transition distortion, which appears whenever the two signals approach a condition of frequency crossover, constitutes a performance limitation on the simpler (and more practical) forms of the feedforward technique in applications that require close reproduction of the weaker-signal message. If the two signals are cochannel, they may often pass through zero frequency difference, with consequent severe distortion in the weaker-signal reception at the receiver output. However, if the center frequencies of the signals are separated so that their instantaneous frequencies seldom, or never, coincide, the distortion will not be present. In a way, the feedforward system of FIG. 4 is an extremely simple realization of a simultated ideal bandpass filter with extremely sharp cutoff characteristics for FM signals that can be expected to sweep over non-overlapping (or only slightly overlapping) frequency channels.

The weaker- (or stronger-) signal capture-enhancement performance of the feedforward scheme can be improved significantly over the performance indicated in the results of the preceding analysis of the system of FIG. 4, at the expense of increased complication of the system. One way to do this is to increase the number of narrowband limiters in the upper signal paths shown in FIG. 4. Another way is to use feedback around the limiter. Although small differences in the phase shifts of the two paths may not affect the over-all performance materially, the difficulty in achieving proper phasing of the combined outputs within tolerable limits is a decided disadvantage of the more complicated systems.

The principles I have just outlined have been verified in the laboratory. Substantial improvements were observed in the stronger-signal capture performance of an FM receiver when a feedforward circuit with appropriate adjustments was introduced. The same circuit, when readjusted as indicated by the above theory, enabled me to extract an intelligible and useful replica of the message of the much weaker of the two FM signals whose spectra overlapped over the whole passband of the receiver. The quality of the weaker-signal capture performance improved rapidly as the unmodulated-carrier frequencies of the two signals were separated. High-quality reception of either of the two signals was achieved simply by varying the adjustment to select the desired signal even when the two signal frequencies were modulated so as to sweep contiguous halves of the receiver passband. One of the experimental receivers that incorporated the feedforward system was designed so that the weaker- and the stronger-signal messages were simultaneously available at two independent outputs, with the stronger- and weaker-signal "channels" sharing all circuits up to and including the amplifier path of the feedforward system. At that point, two feedforward arrangements were made, one to capture the stronger signal, and the other to capture the weaker signal. The signals were then fed to two separate FM demodulators that delivered the messages of the separate signals.

In FIG. 6 we present, for illustration, the schematic of one of the feedforward circuits that were used in testing the effectiveness of this technique. With reference to FIG. 6, tube $V_1$ with its associated circuits is a conventional pentode limiter whose associated filter $F_1$ has a bandwidth of the order of one i-f bandwidth. This limiter, (which corresponds to the first limiter in FIG. 4(*b*)) is driven from the output of the conventional i-f amplifier contained in block 2, and it supplies an adequate driving voltage for the succeeding stages (starting with tube $V_2$). Tube $V_2$ and its associated circuits is a cathode follower that provides low-impedance drive for the grounded-grid amplifier (tube $V_3$) and the pentode limiter (tube $V_4$). The plate circuits of $V_3$ and $V_4$ feed the same bandpass filter ($F_2$) where the currents from the amplifier $V_3$ and the limiter $V_4$ are superimposed in phase opposition. The signal that appears across the output terminals of the bandpass filter $F_2$ represents the output of the feedforward system. The recombination ratio, $K$, of the signals from the amplifier $V_3$ and the limiter $V_4$ can be adjusted for suppressing whichever of the two input signals is undesired simply by varying the setting of either potentiometer $P_l$ or potentiometer $P_a$, or both. The setting of $P_l$ controls the level of the signal that the limiter $V_4$ will deliver to the filter $F_2$, whereas $P_a$ controls the signal that the amplifier $V_3$ will deliver to $F_2$.

The variable capacitor $C$ is helpful for adjusting the phasing of the signals that drive $V_3$ and $V_4$.

The possibility of achieving an adequate capture of the weaker signal with economical modifications in a conventional FM receiver suggests that a new system of "amplitude-discrimination" duplexing could be used to double the number of messages that are transmitted on a given FM channel. In this system, a given transmitter would radiate two cochannel radio-frequency carriers that need generally differ only in amplitude. In a commercial broadcast application of this system, the compatibility of the system to existing conventional FM receivers can be assured by a proper choice of the amplitude ratio of the two carriers (e.g., $a=0.2$). FM receivers that are intended to receive the duplex transmission could, if desired, be equipped with two outputs—one for each program. In this way, binaural and other programs could be transmitted on a single FM channel.

In some applications, this possible technique for doubling the number of messages transmitted over a single channel might be considered to augment, rather than to compete with, other existing techniques.

The experimental results that we have accumulated in our investigation of the techniques of this invention show that the total distortion and cross talk that appears on the message of the weaker signal when either of these techniques were used, varies with the frequency separation of the unmodulated carriers. These results indicate, in general, that in applications in which stringent requirements on the quality of reproduced messages at the output are imposed, the assigned channel must be divided into two contiguous subchannels in order to minimize the unavoidable distortion that will result from frequency crossovers between the two carriers. Such applications might, for example, be concerned with the transmission of two independent high-quality programs or with binaural transmission of one such program. The techniques that have been described for the separation of the carriers amount, in these applications, to simple, effective, and economical realizations of a close approximation to the ideal filter with the extremely sharp transition from passband to rejection band. In other applications, in which the emphasis is placed on the usefulness rather than on the high quality of the received replicas of the transmitted message, each carrier could, if it is so desired, be swept in frequency over the entire assigned channel. Note that only the received message of the weaker carrier will then show unavoidable distortion as a result of this deliberate interference. The stronger signal is still capturable within the stringent requirements on quality.

Finally, even though my description of these techniques is in terms of suppression of interference that arises from the superposition of two signals, these techniques are also applicable to situations in which three or more signals are superimposed and at least one of them is capturable.

While I have indicated and described several systems for carrying my invention into effect, it will be apparent to one skilled in the art that my invention is by no means limited to the particular embodiments, organizations, and illustrations shown and described, but that many modifications may be made without departing from the scope and basic mechanism of my invention, and I therefore wish not to be limited to what I have described. Thus, I contemplate by the appended claims to cover any such modifications and specific realizations as fall within the true spirit and scope of my invention.

What I claim is:

1. A frequency modulation receiver for separating a stronger and a weaker signal comprising two channels, first limiting means in a first channel, second limiting means in said first channel, limiting means in the second channel, linear transfer means in said second channel, and means for combining the outputs of the two channels.

2. A frequency modulation receiver for separating a stronger and a weaker signal comprising two channels, first limiting means in a first channel, second limiting means in said first channel, limiting means in the second channel, said first limiting means and said limiting means in the second channel being common to both channels, and means for combining the outputs of the two channels.

3. A frequency modulation receiver for separating a stronger and a weaker signal comprising two channels, a driver for the two channels, limiting means in one channel operating to limit the amplitude of the resultant of the signals, linear transfer means in the other channel, means for maintaining the signal level at the output of the linear transfer channel independent of the signal level at the input of the driver, and means for combining the outputs of the two channels.

4. A frequency modulation receiver according to claim 3 in which the channel output combining means superimposes the outputs of the channels in phase opposition to cause capture of the weaker of the two signals.

5. A frequency modulation receiver according to claim 3 in which the channel output combining means superimposes the outputs of the channels in phase opposition to suppress the weaker of the two signals.

6. A frequency modulation receiver for separating a stronger and a weaker signal comprising two channels, limiting means in one channel operating to limit the amplitude of the resultant of the signals, linear transfer means in the other channel, means for driving the two channels at a level independent of receiver input signal level, and means for combining the outputs of the two channels.

7. A frequency modulation receiver according to claim 6 in which the channel output combining means superimposes the outputs of the channels in phase opposition to cause capture of the weaker of the two signals.

8. A frequency modulation receiver according to claim 6 in which the output combining means superimposes the outputs of the channels in phase opposition to suppress the weaker of the two signals.

9. A frequency modulation receiver for separating a stronger and a weaker signal, comprising two channels, limiting means for driving the two channels at a level independent of receiver input signal level, second limiting means in one of the channels, an amplifier in the other channel, and means for combining the outputs of the two channels.

10. A frequency modulation receiver according to claim 9 in which the channel output combining meanas superimposes the outputs of the channels in phase opposition to cause capture of the weaker of the two signals.

11. A frequency modulation receiver according to claim 9 in which the channel output combining means superimposes the outputs of the channels in phase opposition to suppress the weaker of the two signals.

* * * * *